United States Patent [19]

Maeland et al.

[11] 4,425,318

[45] Jan. 10, 1984

[54] HYDRIDING BODY-CENTERED CUBIC PHASE ALLOYS AT ROOM TEMPERATURE

[75] Inventors: Arnulf J. Maeland, Succasunna; George G. Libowitz, Brookside; George Rak, Pinebrook, all of N.J.

[73] Assignee: Allied Corporation, Morris Township, Morris County, N.J.

[21] Appl. No.: 365,119

[22] Filed: Apr. 5, 1982

Related U.S. Application Data

[63] Continuation-in-part of Ser. No. 320,391, Nov. 12, 1981, abandoned.

[51] Int. Cl.³ .............................................. C01B 6/24
[52] U.S. Cl. ................................ 423/644; 423/648 R; 423/248
[58] Field of Search .................. 423/644, 645, 648 R, 423/248

[56] References Cited

U.S. PATENT DOCUMENTS

| | | | |
|---|---|---|---|
| 4,160,014 | 7/1979 | Gamo et al. | 423/644 |
| 4,178,987 | 12/1979 | Bowman et al. | 423/644 |
| 4,228,145 | 10/1980 | Gamo et al. | 423/644 |
| 4,278,466 | 7/1981 | Poris | 423/644 |
| 4,300,946 | 11/1981 | Simons | 423/645 |

*Primary Examiner*—Herbert T. Carter
*Attorney, Agent, or Firm*—Thomas D. Hoffman; Alan M. Doernberg; Gerhard H. Fuchs

[57] ABSTRACT

Solid solution of niobium or tantalum and a second metal react rapidly with hydrogen under mild conditions, eliminating the need for a high temperature induction process. Suitable second metals include Al, Co, Cr, Fe, Mn, Mo, Ni, Cu, V, Si, Ge and Ga.

12 Claims, No Drawings

HYDRIDING BODY-CENTERED CUBIC PHASE ALLOYS AT ROOM TEMPERATURE

DESCRIPTION

CROSS-REFERENCE TO RELATED APPLICATION

This application is a continuation-in-part of our copending U.S. patent application Ser. No. 320,391, filed Nov. 12, 1981 and now abandoned.

BACKGROUND OF THE INVENTION

The present invention relates to the reaction of hydrogen gas with transition metal alloys, and particularly to the rapid reaction at mild temperatures of hydrogen gas with alloys containing niobium or tantalum.

Most metals that form hybrides react very slowly in bulk form at room temperature with hydrogen gas. Metallic niobium, for example, is relatively inert in bulk form at room temperature in the presence of hydrogen gas, with the hydrogen only slowly dissolving in the body-centered cubic phase structure of the metal until saturated (the so-called alpha phase), and then additional hydrogen reacting only slowly to form a precipitated niobium hydride. Most other metals that form hydrides react in a similar fashion, with the rate of alpha phase formation and hydride formation varying among metals and alloys, but rarely occurring at room temperature in less than one hour. Attempts to increase this rate by plating over niobium with nickel or palladium or iron have been reported.

For many applications of metal hydrides, it is desirable to form the hydride from bulk metal, pulverize the hydride into some form of granular or powder structure, and thereafter cyclically remove hydrogen to form a lower hydride or the free metal and thereafter reintroduce hydrogen to form the original hydride. Starting with bulk metal or bulk alloy, it is normally necessary to go through an induction period, wherein the metal is heated to a temperature such as 300°-700° C., then reacted with hydrogen at high pressure and then cooling the system very slowly until a temperature below about 100° C., and preferably about room temperature, is reached. At the higher temperature, the rate of hydrogen dissolving in the metal (the alpha phase) is increased so as to achieve saturation in a matter of minutes rather than hours or days. At the high temperature, however, the equilibrium hydrogen pressure is so high that relatively little hydrogen actually dissolves or forms hydride. Accordingly, it is only upon gradual cooling that saturated alpha phase forms, and thereafter hydrides form. While many metals require only a single induction process to form the hydride, with the subsequent hydride powder cycling at a reasonable reaction rate, it should be apparent that the induction process represents a distinct disadvantage in forming and utilizing metal hydrides.

BRIEF DESCRIPTION OF THE INVENTION

It has been surprisingly found that certain alloys of niobium and tantalum, even in bulk form, react rapidly with hydrogen at mild temperatures such as below about 100° C., forming hydrides in a matter of seconds or minutes even at room temperature. Accordingly, the present invention includes a method of producing a metal hydride which comprises reacting hydrogen gas at a temperature between about 0° C. and about 100° C. with a solid solution comprising:

(a) a first metal forming a body-centered cubic phase structure selected from the group consisting of niobium, tantalum and mixtures thereof; and (b) dissolved in said body-centered cubic phase structure at least about 0.5 atom percent of at least about one second metal selected from the group consisting of aluminum, cobalt, chromium, iron, manganese, molybdenum, nickel, copper, vanadium, silicon, germanium, gallium and mixtutes thereof; and wherein the reaction rate of said solid solution with hydrogen at said temperature is at least about twice the reaction rate of said first metal with hydrogen at said temperature and identical hydrogen pressures.

DETAILED DESCRIPTION OF THE INVENTION

The present invention involves the reaction of hydrogen gas at low temperature with a solid solution of at least two metals. The hydrogen gas employed may be pure hydrogen, at a pressure above the dissociation pressure of the hydride formed at the reaction temperature: e.g. at subatmospheric, atmospheric or superatmospheric pressures such as between about 0.1 kPa and and about 10,000 kPa. Such pressures may also be employed as the partial pressure of hydrogen in a mixture with other gases which do not poison the hydride forming reaction. The hydrogen may be mixed with inert gases such as argon, helium and nitrogen. Furthermore, the hydrogen may be present in a mixture with gases such as carbon monoxide, water vapor and oxygen, which tend to poison most hydride-forming reactions, but to which certain of the solid solutions of the present invention are relatively immune. Thus, the present invention may be used as a means of removing hydrogen from such gas mixtures; for example, removing hydrogen from mixtures of hydrogen and helium or removing hydrogen from mixtures of hydrogen and carbon monoxide or carbon dioxide such as are formed in industrial hydrogen-forming reactions. The reaction temperature is desirably between about 0° C. and about 100° C. when the reaction is initiated. Because many of the reactions within the scope of the present invention are highly exothermic, it is contemplated that the temperature may, for short times, exceed 100° C. without adverse effect upon the reaction. In fact, in many of the present reactions, heat removal acts as the rate limiting step, with the reaction taking place in seconds if adequate heat removal is provided. It is preferred to initiate the reaction below about 50° C., with room temperature being a convenient place to start.

The solid solution metal alloy employed in the present invention contains as first metal niobium, tantalum or mixtures thereof. Since these two metals are completely soluble in each other, and since they both form body-centered cubic phase structures, any proportion of the two as against each other may be employed. Niobium is preferred, because it is more readily available and cheaper.

The second metal may be a transition metal of the group cobalt, chromium, iron, manganese, nickel, molybdenum, copper, vanadium or mixtures thereof, or a group III or IV element selected from Al, Si, Ge, Ga or mixtures thereof. It is preferred to employ at least about 0.5 atom percent of second metal, with the upper limit of the second metal being generally determined by the solubility limit of the second metal in the body-centered cubic structure formed by the first metal. For those metals having suitable solubilities, a range of about 1 to about 10% of second metal is preferred. It is possible, when using mixtures of second metals, to sometimes exceed the proportion of second metal permissible with certain second metals alone. In the case of some metals, such as vanadium, where solubility is complete, the preferred maximum second metal content is about 60 atom percent of the total mixture. Especially preferred are compositions of vanadium and niobium between about 40 and about 60 atom percent of each metal.

In Table I, below, the effective metallic radius of each of the first metals and second metals employed in the present invention were shown, based upon values reported in Table B of Max Hansen, Constitution of Binary Alloys 1265 (McGraw Hill 1958). The values for CN=12 were converted to CN=8 by dividing by 1.03. In general, the suitable second metals are those transition metals having metallic radii at least about 5% below the metallic radius of niobium (and also below the similar metallic radius of tantalum). It is expected that other second transition metals having an atomic radius at least about 5% less than that of niobium would be suitable provided that they were soluble to the extent of at least about 0.5 atom percent in the body-centered cubic phase formed by niobium. In the case of non-transition metals (e.g., Al, Ga, Ge and Si) a metallic radius at least about 5% below that of Nb is not required. The hydride-forming behavior of the second metals is not a critical factor in the rapid reaction rate of the present invention, with some of the suitable second metals having low equilibrium hydrogen pressures for binary hydrides, and others having quite high pressures. As shown in Comparative Example 2, some transition metals such as titanium or zirconium listed at the end of Table I having metallic radii larger than vanadium are not suitable, and give slow reaction rates when alloyed with niobium.

The solid solutions of the present invention are not intended, however, to exclude minor proportions of metals other than the first metal and second metal as described above. Thus, for example, while zirconium is not a suitable second metal, it may be present in alloys in combination with the first metal (e.g. niobium) and the second metal (e.g. iron). Some suitable compositions contain about 5-70% titanium or zirconium. It is preferred, however, that metals other than first metal and second metal be limited to no more than about 25 atom percent of the composition, more preferably no more than about 10 atom percent of the composition.

In practicing the invention, it is preferred that the solid solution be in bulk form, or otherwise in a form having an average particle size greater than about 1000 micrometers. While solid solutions having particle sizes less than this size react quickly, a rapid rate may also occur for similar materials (e.g. Nb alone) outside the scope of of the present invention. The advantages of the present invention, thus, are most significantly achieved when using bulk forms (greater than a millimeter) such as are cast directly from the melt.

The following examples illustrate the present invention and show by comparison certain metals and alloys outside the scope of the present invention which react only slowly with hydrogen at mild temperatures. It should be understood that various additions, deletions and modifications of the examples are contemplated within the scope and spirit of the present invention as set forth in the claims that follow.

TABLE 1

| Metal | Metallic Radius (CN = 8)** | % Difference From Nb | Reaction Rate of Alloys of Nb |
|---|---|---|---|
| Nb | 1.43 | 0 | — |
| Ta | 1.43 | 0 | S |
| Co | 1.21 | −15.4 | F |
| Cr | 1.24 | −13.3 | F |
| Fe | 1.23 | −14.0 | F |
| Mn | 1.26 | −11.9 | F |
| Ni | 1.21 | −15.4 | F |
| Cu | 1.24 | −13.3 | S* |
| V | 1.32 | −7.8 | F |
| Ga | 1.35 | −5.6 | F |
| Ge | 1.35 | −5.6 | F |
| Si | 1.30 | −9.1 | F |
| Al | 1.39 | −2.8 | F |
| Mo | 1.36 | −4.9 | F |
| Zr | 1.55 | +8.4 | S |
| Ti | 1.43 | 0 | S |

F = fast
S = slow
*slow with 1% Cu - should be faster with more Cu.
**converted from CN = 12 by dividing by 1.03.

EXAMPLE 1—ALLOYS WITH 1% SECOND METAL

Alloys were prepared by arc melting on a water-cooled copper hearth under argon 99 mol % niobium, separately with 1 mol % of chromium, manganese, iron, cobalt, nickel, copper, vanadium, aluminum, silicon and germanium. Each batch was approximately 4 g. The alloys were cast under argon into buttons approximately 10-12 mm diameter and 7-9 mm height; each button was allowed to cool to near room temperature and remelted; this process was repeated 3-4 times to insure homogenization. Each button was placed in a stainless steel boat inside a quartz tube which was then connected to a vacuum system. The sample was next heated to 700° C. while evacuating (about $10^{-7}$ torr) and then cooled to room temperature. Hydrogen was admitted to a pressure of about one atmosphere. A rapid pressure drop was observed in each case, with heat generated so as to form transient temperature as high as 150° and perhaps higher in some cases. The buttons fractured violently into powder during the reaction; the size distribution obtained from the 99% Nb, 1% Fe alloy is representative: −20+60 mesh (850-240 micrometers), 45.1%; −60+80 mesh (250-180 micrometers), 16.7%; −80+100 mesh (180−150 micrometers), 7.4%; −100+325 mesh (150-45 micrometers), 20.1%; and −325 mesh (less than 45 micrometers), 10.7%. The reaction was generally complete in less than 3 minutes; the final pressure was about 0.8 atom and the composition about 0.9 hydrogen/niobium. The dihydrides can be made either by employing higher hydrogen pressures or by cooling the sample below room temperature.

COMPARATIVE EXAMPLE 2

The procedure of Example 1 was repeated with alloys of 90 mol % niobium and 10 mol %, separately, of tantalum and zirconium. In some cases less than 10% second metal was actually dissolved. After pressurization with hydrogen, no significant hydrogen pressure drop was observed, with the pressure remaining above 100 kPa after 24 hours at room temperature.

EXAMPLE 3

The general procedure of Example 1 was followed for each of the $Nb_{1-x}M_x$ alloys indicated by the first two columns of Table 2. The reaction was monitored based on pressure drop and the approximate time noted when the reaction had gone 80% to completion at room temperature. The final hydride after equilibrium was reached (generally 3–5 minutes) was then analyzed by x-ray diffraction. These times and compositions are reported in Table 2. Thus, the first line indicates $Nb_{97}Cr_3$ reacting at least 80% in about 140 seconds, with the product at equilibrium being $Nb_{97}Cr_3H_{84}$.

TABLE 2

| $Nb_{1-x}M_x$ | | Reaction 80% | Final Composition | | |
|---|---|---|---|---|---|
| M | x | Complete (seconds) | Nb | M | H |
| Cr | 0.03 | 140 | 97 | 3 | 84 |
| Cr | 0.05 | 120 | 95 | 5 | 82 |
| Cr | 0.10 | 120 | 90 | 10 | 82 |
| Mn | 0.10 | <100 | 90 | 10 | 85 |
| Fe | 0.01 | 100 | 99 | 1 | 88 |
| Fe | 0.05 | 240 | 95 | 5 | 87 |
| Fe | 0.10 | 150 | 90 | 10 | 80 |
| Co | 0.01 | 120 | 99 | 1 | 88 |
| Co | 0.03 | 100 | 97 | 8 | 87 |
| Co | 0.05 | 100 | 95 | 5 | 84 |
| Co | 0.10 | 150 | 90 | 10 | 73 |
| Mo | 0.05 | S* | 95 | 5 | 86 |
| Mo | 0.10 | 180 | 90 | 10 | 76 |
| Mo | 0.20 | 150 | 80 | 20 | 65 |
| Mo | 0.30 | 260 | 70 | 30 | 45 |
| Ni | 0.01 | 160 | 99 | 1 | 88 |
| Ni | 0.02 | 60 | 98 | 2 | 89 |
| Ni | 0.03 | 60 | 97 | 3 | 86 |
| Ni | 0.05 | 60 | 95 | 5 | 85 |
| Ni | 0.10 | 180 | 90 | 10 | 74 |
| V | 0.10 | <80 | 90 | 10 | 82 |
| V | 0.50 | <100 | 50 | 50 | 80 |
| V | 0.60 | 160 | 40 | 60 | 64 |
| V | 0.70 | S | 30 | 70 | 60 |
| Al | 0.10 | 240 | 90 | 10 | 72 |
| Si | 0.02 | <100 | 98 | 2 | 85 |
| Ge | 0.02 | <100 | 98 | 2 | 84 |
| Ga | 0.06 | <80 | 94 | 6 | 74 |

*ca. 1 hr.

EXAMPLE 4

The procedure of Example 3 was repeated with the ternary alloys $Nb_{1-x-y}M_xZ_y$ indicated by the first three columns of Table 3, with the times to 80% completion and final compositions at equilibrium indicated in Table 3.

TABLE 3

| $Nb_{1-x-y}M_xZ_y$ | | | | Reaction 80% Complete | Final Composition | | | |
|---|---|---|---|---|---|---|---|---|
| M | x | Z | Y | (seconds) | Nb | M | Z | H |
| Ti | 0.38 | Ge | 0.05 | 400 | 57 | 38 | 5 | 169 |
| Ti | 0.47 | Ge | 0.06 | 350 | 47 | 47 | 6 | 168 |
| Zr | 0.25 | Fe | 0.10 | 360 | 65 | 25 | 10 | 163 |

What is claimed is:

1. A method of producing metal hydride which comprises reacting hydrogen gas at a temperature between about 0° C. and about 100° C. with a solid solution having a body-centered cubic phase structure comprising:
   (a) a first metal forming a body-centered cubic phase structure selected from the group consisting of niobium, tantalum and mixtures thereof; and
   (b) dissolved in said body-centered cubic phase structure at least about 0.5 atom percent of a second metal selected from the group consisting of aluminum, cobalt, chromium, iron, manganese, molybdenum, nickel, copper, vanadium, silicon, germanium, gallium and mixtures thereof;
   and wherein the reaction rate of said solid solution having said body-centered cubic phase structure with hydrogen at said temperature is at least about twice the reaction rate of said first metal with hydrogen at said temperature and identical hydrogen pressures.

2. The method of claim 1 wherein said first metal is niobium.

3. The method of claim 1 or 2 wherein the second metal is vanadium.

4. The method of claim 1 or 2 wherein the said solid solution further comprises between about 5 and about 70 atom percent of at least one additional metal selected from the group consisting of zirconium and titanium, the amounts of said additional metal and said second metal being sufficiently small to be jointly soluble in and still maintain said body-centered cubic phase structure.

5. The method of claim 1 or 2 wherein said second metal is selected from the group consisting of aluminum, silicon, germanium, gallium and mixtures thereof.

6. The method of claim 5 wherein said second metal is silicon.

7. The method of claim 5 wherein said second metal is present in an amount between about 1 and about 10 atom percent.

8. The method of claim 1 wherein said second metal is present in an amount between about 1 and about 10 atom percent.

9. The method of claim 1 wherein said temperature is between about 0° C. and about 50° C.

10. The method of claim 1 wherein said solid solution is in bulk form having a particle size greater than about 1000 micrometers.

11. The method of claim 1 wherein hydrogen gas is present in a mixture with at least one inert gas.

12. The method of claim 1 wherein hydrogen gas is present in a gas mixture comprising hydrogen, inert gases and minor amounts of carbon monoxide, which mixture is substantially free of hydride poisoning gases.

* * * * *